(12) United States Patent
Azuma

(10) Patent No.: US 7,366,686 B2
(45) Date of Patent: Apr. 29, 2008

(54) SALES SUPPORT SYSTEM AND METHOD THEREFOR

(75) Inventor: Tomihiko Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 845 days.

(21) Appl. No.: 09/921,903

(22) Filed: Aug. 6, 2001

(65) Prior Publication Data

US 2002/0023025 A1 Feb. 21, 2002

(30) Foreign Application Priority Data

Aug. 10, 2000 (JP) ............................. 2000-243164

(51) Int. Cl.
*G06Q 30/00* (2006.01)

(52) U.S. Cl. ..................................................... 705/26

(58) Field of Classification Search .................. 705/26
See application file for complete search history.

(56) References Cited

U.S. PATENT DOCUMENTS

| | | | | |
|---|---|---|---|---|
| 5,710,887 A | * | 1/1998 | Chelliah et al. | 705/26 |
| 6,085,170 A | | 7/2000 | Tsukuda | 705/26 |
| 6,125,352 A | * | 9/2000 | Franklin et al. | 705/26 |
| 6,405,177 B1 | * | 6/2002 | DiMattina | 705/26 |
| 6,460,020 B1 | * | 10/2002 | Pool et al. | 705/26 |
| 6,535,880 B1 | * | 3/2003 | Musgrove et al. | 707/10 |
| 6,594,641 B1 | * | 7/2003 | Southam | 705/26 |
| 6,598,027 B1 | * | 7/2003 | Breen et al. | 705/26 |
| 6,697,843 B1 | * | 2/2004 | Carlin et al. | 709/206 |
| 6,748,366 B1 | * | 6/2004 | Hurwitz et al. | 705/53 |
| 6,807,530 B1 | * | 10/2004 | Shub et al. | 705/1 |
| 2004/0002903 A1 | * | 1/2004 | Stolfo et al. | 705/26 |

FOREIGN PATENT DOCUMENTS

| | | |
|---|---|---|
| JP | 6-141100 | 5/1994 |
| JP | 9-330354 | 12/1997 |
| JP | 9-330470 | 12/1997 |
| JP | 10-162065 | 6/1998 |
| JP | 10-162066 | 6/1998 |
| JP | 10-207956 | 8/1998 |
| JP | 2002-42005 | 2/2002 |
| WO | 97/28510 | 8/1997 |

* cited by examiner

*Primary Examiner*—Thomas A Beach
(74) *Attorney, Agent, or Firm*—Foley & Lardner LLP

(57) ABSTRACT

A product sales and delivery support system performs support of product sales and delivery via a communication network, whereby a purchaser orders product from a plurality of sellers and specifies batch delivery of all ordered product by a single delivery agent.

2 Claims, 5 Drawing Sheets

Fig. 3

SELLER A

| PURCHASE | NAME | PRODUCT NUMBER | PRICE | QUANTITY |
|---|---|---|---|---|
| ■ | BOOK A | 00001 | ¥3,200 | 1 |
| ☐ | POCKET EDITION BOOK B | 00002 | ¥550 | |
| ■ | DICTIONARY C | 00003 | ¥12,500 | 1 |
| ☐ | ... | ... | ... | ... |

[SHIPPING AGENT] 101

Fig. 4

| SELECT | DELIVERY AGENT NAME | URL | TELEPHONE NUMBER |
|---|---|---|---|
| ■ | C TRANSPORT | http://www.... | xxxxxxxx |
| ☐ | DOOR-TO-DOOR DELIVERY SERVICE D | http://www.... | yyyyyyyy |
| ■ | E TRANSPORT | http://www.... | zzzzzzzz |
| ☐ | ... | ... | |

[PURCHASE] 102

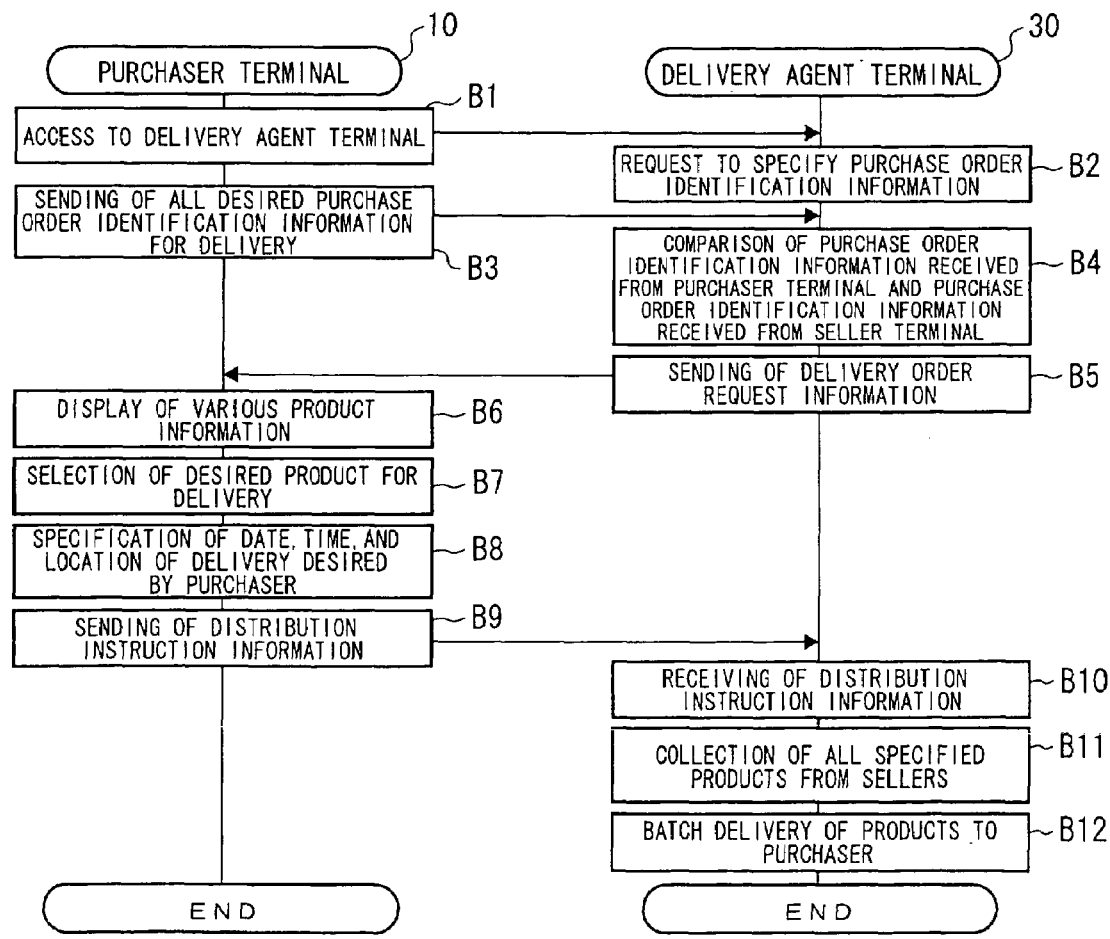

DOOR-TO-DOOR DELIVERY SERVICE D

| DELIVERY | NAME | SELLER NAME | PRODUCT NUMBER | QUANTITY | ID |
|---|---|---|---|---|---|
| ■ | BOOK A | A | 00001 | 1 | ****** |
| ■ | DICTIONARY C | A | 00002 | 1 | ****** |
| ■ | CD-Y | B | CD-0311 | 1 | ****** |
| ☐ | 200-SHEET PACK OF COPIER PAPER | C | CPA001 | 1 | |
| ☐ | BLACK INK CARTRIDGE | C | ICB001 | 4 | |
| ... | ... | ... | ... | ... | ... |

DELIVERY DATE AND TIME: MAY 1, 2000
DELIVERY LOCATION: SHIBAURA, MINATO-KU, TOKYO

[DELIVERY] 104

SALES SUPPORT SYSTEM AND METHOD THEREFOR

BACKGROUND OF THE INVENTION

1. Field of the Invention

The present invention relates to a sales support system and method providing support for product sales and delivering, having a purchaser terminal used by a purchaser, a seller terminal used by selling company, and a delivery agent terminal used by a delivery agent, these terminals being capable of mutual communication via a communication network, and more particularly to a product sales support system, method, and a computer program for implementing same, whereby batch delivering is performed by giving an instruction for product pickup.

2. Related Art

In a sales support system of the past for on-line shopping, which uses a network such as the Internet, an order for a product is accepted from a purchaser via the network, and the product is delivered to the purchaser at an address that a home delivery service or the like is instructed to make the delivery to. Referring to FIG. 8, a product sales support system of the past was formed by a purchaser terminal 110, a seller terminal 120 disposed at a seller location, a shipping agent terminal 130 disposed at a shipping agent, and the Internet 140 which connects the above-noted terminals.

Using the purchaser terminal 110, a purchaser, who is a user of the above-noted system, accesses a product sales website established on the Internet by a selling company, decides on a product to purchase, and orders the product from the purchaser terminal 110. The purchaser also specifies the address at which the product is to be received, and whether delivery is to be made in the morning or in the afternoon, for example, this information being entered from a display screen on the purchaser terminal 110.

Upon receiving an order, the seller terminal 120 issues an instruction to the delivery agent terminal 130 to deliver the product ordered by the purchaser to the specified address. In accordance with this instruction, the delivery agent goes to get the product from the warehouse or the like of the selling company, and delivers the product to the specified address in the specified time slot.

In the above-noted technology of the past, however, there are the following problems.

One problem is that, because the ordering of the product and the shipping of the product are managed separately, it was necessary for the seller to issue a separate instruction to the delivery agent separately for each order. For this reason, in the case in which a purchaser purchases products from a plurality of sellers, it was necessary for the purchaser to specify the delivery agent for each shipping agent individually, and to pay a delivery fee separately for each delivery agent.

Additionally, even if the purchaser specified the same time for delivery with respect to a plurality of products, because the actual delivery times depend upon the number of jobs held by each of the delivery agents, there was the problem that the purchaser could not leave home until all the products were delivered.

Accordingly, it is an object of the present invention to provide a sales support system and method capable of reducing the administrative burden on the seller.

It is a further object of the present invention to provide a sales support system and method whereby a purchaser can conveniently receive products.

SUMMARY OF THE INVENTION

To achieve the above-noted objects, the present invention adopts the following technical constitutions.

The first aspect of a sales and delivery support system of the present invention is a system which supports product sales and delivery using a purchaser terminal used by a purchaser, a seller terminal used by a seller, and a delivery agent terminal used by a delivery agent, the terminals being capable of mutual communication via a communication network, wherein a first means in which the seller terminal sends to the purchaser terminal product information with respect to a plurality of products which the seller sells and delivery agent information with respect to a plurality of delivery agents which deliver the products to the purchaser, in response to an access from the purchaser terminal, a second means in which the seller terminal receives information regarding products which the purchaser specifies to order and information in which the purchaser specifies a desired delivery agent for delivery of the ordered product, from the purchaser terminal, and generates purchase order identification information to identify the purchaser and the ordered product and for use to deliver the ordered product by the specified delivery agent, and a third means in which the seller terminal sends the purchase order identification information to the purchaser terminal and the delivery agent terminal.

The second aspect of a sales and delivery support system of the present invention is a system which supports product sales and delivery using a purchaser terminal used by a purchaser, a seller terminal used by a seller, and a delivery agent terminal used by a delivery agent, the terminals being capable of mutual communication via a communication network, wherein a first means in which the delivery agent terminal receives purchase order identification information to identify a purchaser and a product ordered by the purchaser, from the seller terminal, a second means in which the delivery agent terminal requests to the purchaser terminal, to specify purchase order identification information issued by the seller terminal, in response to an access from the purchaser terminal, a third means in which the delivery agent terminal receives purchase order identification information from the purchaser terminal, and compares the purchase order identification information received from the purchaser terminal with the purchase order identification information received from the seller terminal, a fourth means in which the delivery agent terminal sends delivery order request information to request to specify a desired delivery agent for delivery of the ordered product, to the purchaser terminal, when there is coincidence between the two purchase order identification information, and a fifth means in which the delivery agent terminal receives from the purchaser terminal delivery instruction information which specifies an ordered product, a desired delivery agent and desired delivery date/time/location by the specified delivery agent.

The first aspect of a sales and delivery support method of the present invention comprises the steps of; sending product information with respect to a plurality of products which the seller sells and delivery agent information with respect to a plurality of delivery agents which deliver the products to the purchaser, from the seller terminal to the purchaser terminal, in response to an access from the purchaser terminal, receiving information regarding products which the purchaser specifies to order and information in which the purchaser specifies a desired delivery agent for delivery of the ordered product, from the purchaser terminal, generating purchase order identification information to identify the purchaser and the ordered product and for use to deliver the ordered product by the specified delivery agent, in the seller terminal, and sending the purchase order identification information from the seller terminal to the purchaser terminal and the delivery agent terminal.

The second aspect of a sales and delivery support method of the present invention comprises the steps of; receiving purchase order identification information to identify a purchaser and a product ordered by the purchaser, from the seller terminal, in the delivery agent terminal, sending a request to specify purchase order identification information issued by the seller terminal, from the delivery agent terminal to the purchaser terminal, in response to an access from the purchaser terminal, receiving purchase order identification information from the purchaser terminal in the delivery agent terminal, comparing the purchase order identification information received from the purchaser terminal with the purchase order identification information received from the seller terminal, in the delivery agent terminal, sending delivery order request information to request to specify a desired delivery agent for delivery of the ordered product, from the delivery agent terminal to the purchaser terminal, when there is coincidence between the two purchase order identification information, and receiving from the purchaser terminal delivery instruction information which specifies an ordered product, a desired delivery agent and desired delivery date/time/location by the specified delivery agent, in the delivery agent terminal.

BRIEF DESCRIPTION OF THE DRAWINGS

FIG. 3 is a drawing showing product information provided by a seller terminal in a sales and delivery support system according to an embodiment of the present invention.

FIG. 4 is a drawing showing delivery agent information provided by a seller terminal in a sales and delivery support system according to an embodiment of the present invention.

FIG. 5 is a drawing showing product information provided by a seller terminal in a sales and delivery support system according to an embodiment of the present invention.

FIG. 6 is a flowchart showing the operation of a sales and delivery support system according to the second embodiment of the present invention.

DETAILED DESCRIPTION OF THE PREFERRED EMBODIMENTS

Embodiments of the present invention are described in detail below, with references made to relevant accompanying drawings.

First Embodiment

Figure 1:
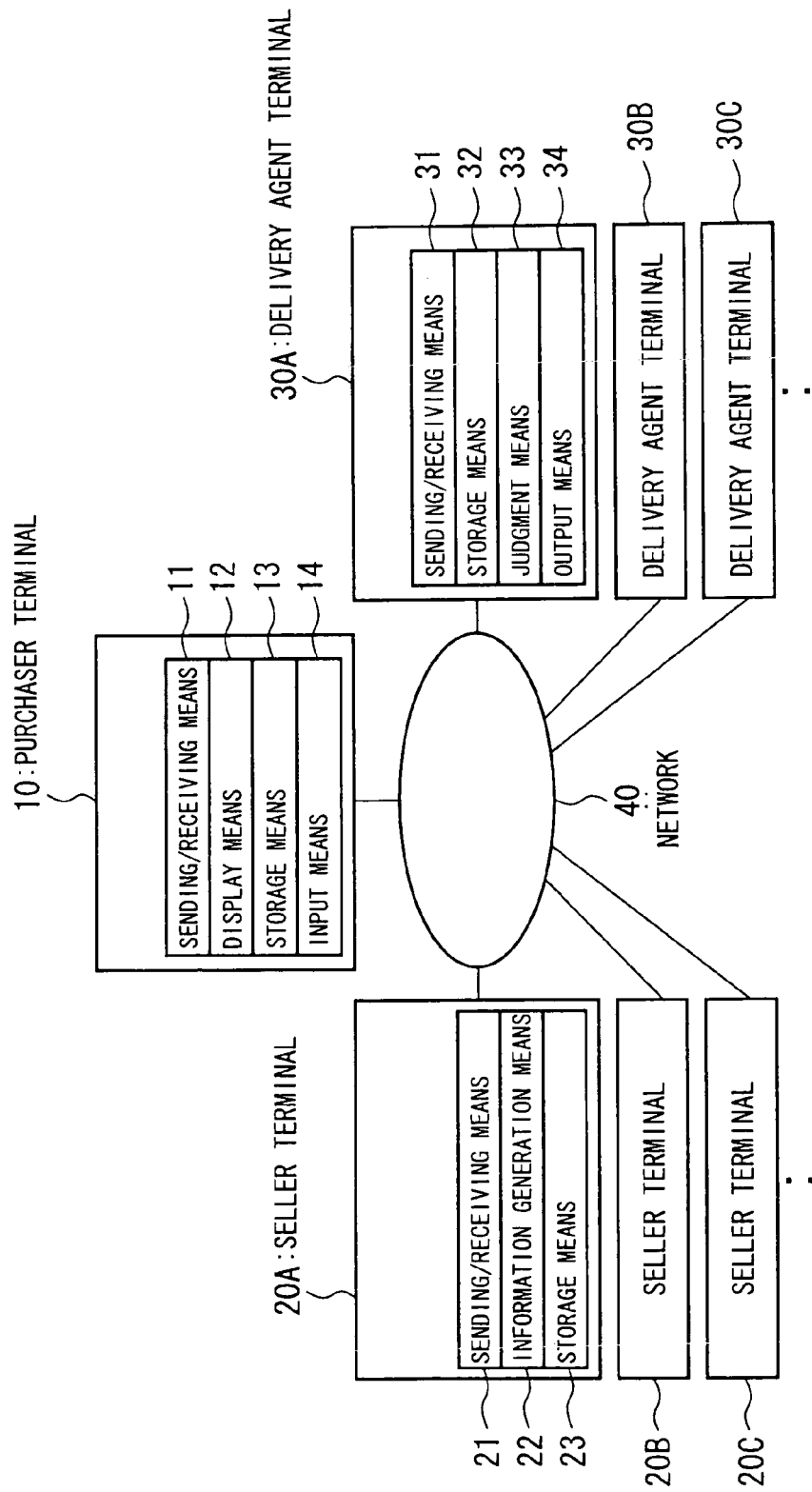
FIG. 1 is a block diagram showing in schematic diagram of a sales and delivery support system according to an embodiment of the present invention.

Specifically, FIG. 1 is a block diagram showing the configuration of a sales and delivery support system according to the first embodiment of the present invention. This sales and delivery support system is formed by a purchaser terminal 10, seller terminals 20A, 20B, and 20C, delivery agent terminals 30A, 30B, and 30C, and a communication network 40 such as the Internet or the like.

The purchaser terminal 10 is a personal computer, a portable information terminal, or a portable telephone used by a purchaser. This purchaser terminal 10 has a sending and receiving means 11, a display means 12, a storage means 13, and an input means 14. The sending and receiving means 11 of the purchaser terminal 10 accesses product information made available on a web page provided on the network 40 by the seller terminal 20 (Step A1), receives product information and delivery agent information sent from the seller terminal 20 (Step A3), sends purchase order information and distribution specification information to a seller terminal 20 (Step A7), receive purchase order identification information sent from the seller terminal 20 (Step A10), accesses the delivery agent terminal 30 (Step B1), receives a request to specify purchase order identification information from the delivery agent terminal 30 (Step B2), sends purchase order identification information to the delivery agent terminal 30 (Step B3), receives delivery order request information sent from the delivery agent terminal 30 (Step B5), and sends delivery instruction information to the delivery agent terminal 30 (Step B5). In this system, the purchase order information is product information regarding a product that a purchaser wishes to order, delivery instruction information is information indicating a delivery agent which is to handle collection of an ordered product, purchase order identification information, which is drawn up by the seller terminal 20, is information for identifying a purchaser and details of an order, and delivery specification information is information that includes desired delivery order information and desired delivery date/time and location information. The display means 12 of the purchaser terminal 10 displays product information and the like on a screen thereof. The storage means 13 of the purchaser terminal 10 stores purchase order information, and the distribution specification information and the like. The product information is, for example, information with regard to a product, such as a compact disk, a book, office supplies, or software or the like, and includes such information as a product name, model, product number, color and price or the like. Information such as the purchase order information, the distribution specification information and the like are input to the purchaser terminal 10 by means of the input means 14.

The seller terminals 20A, 20B, and 20C are data processing apparatuses, such as workstations, which are used by product sellers. Each of the seller terminals 20A, 20B, and 20C has a sending and receiving means 21, an information generation mean 22, and a storage means 23. The sending and receiving means 21 receives access from the purchaser terminal 10 (Step A1), sends product information and delivery agent information to the purchaser terminal 10 (Step A2), receives purchase order information and distribution specification information sent from a purchaser terminal 10 by a purchaser's operation (Step A7), and sends purchase order identification information generated by the information generation means 22 of the seller terminal 20 to the purchaser terminal 10 and the delivery agent terminal 30 (Step A10). The information generation mans 22 generates purchase order identification information based on purchase order information sent from the purchaser terminal 10. The storage means 23 stores information such as product information including information with regard to products sold, and delivery agent information including information with regard to delivery agents. The purchase order identification information is information for the identification of a purchaser and the details of an order, and is generated uniquely for each sale-purchase transaction.

The delivery agent terminals 30A, 30B, and 30C are information processing apparatuses such as workstations used by delivery agents. Each of the delivery agent terminals 30A, 30B, and 30C has a sending and receiving means 31, a storage means 32, a judgment means 33, and an output means 34. The sending and receiving means 31 receives purchase order identification information sent from a seller terminal 20 (Step A11), receives access from a purchaser terminal 10 (Step B1), sends a request to specify purchase order identification information to a purchaser terminal 10 (Step B2), receives purchase order identification information from the purchaser terminal 10, in response to the request from the delivery agent terminal 30 (Step B3), sends delivery order request information to the purchaser terminal 10 (Step B5), and receives delivery instruction information sent from the purchaser terminal 10 (Step B10). The storage means 32 stores information such as received purchase order identification information. Delivery instruction information sent from a purchaser terminal 20 is information indicating a delivery agent which is to handle collection of an ordered product, the date and time of delivery, and the delivery location. The judgment means 33 compares purchase order identification information sent from the purchaser terminal 10 and purchase order identification information sent from the seller terminal 20 and makes a judgment as to whether or not there is coincidence therebetween. The output means 34 performs such tasks as displaying and printing out of various information. When a delivery agent receives delivery instruction information from a purchaser terminal 10, the delivery agent collects from the seller the product corresponding to a purchase order identification information, and deliveries the product to a location and at a time specified by the purchaser.

Figure 2:
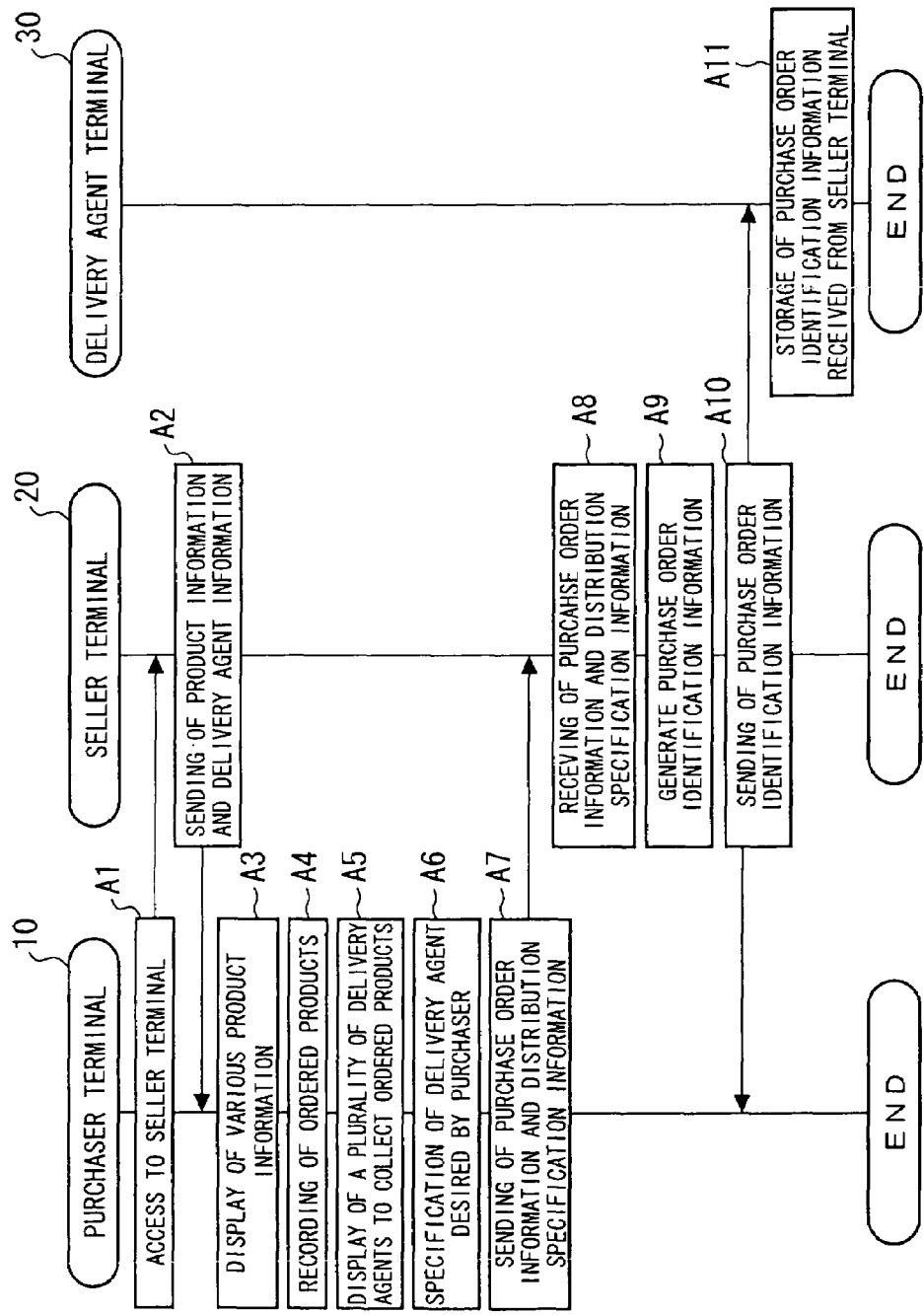
FIG. 2 is a flowchart showing the operation of a sales and delivery support system according to the first embodiment of the present invention.

The operation of the above-noted embodiment of the present invention is described below, with reference to relevant accompanying drawings. FIG. 2 is a flowchart showing the operation of a sales and delivery support system according to an embodiment of the present invention. FIG. 3 is a drawing showing product information provided by a seller terminal 10. FIG. 4 is a drawing showing delivery agent information provided by a seller terminal 10. FIG. 5 is a drawing showing product information provided by a seller terminal 10. In the description to follow, it will be understood that the network 40 is the Internet.

First, the operation occurring when a purchaser purchases a product from a plurality of sellers is described in detail below. Referring to FIG. 2, the purchaser accesses a product sales web page established by a seller on the network 40, using the purchaser's own terminal (Step A1). In response to this, the seller terminal 20 sends product information and delivery agent information to the purchaser terminal 10 (Step A2). Various product information is displayed on a screen at the purchaser terminal 10, as shown in FIG. 3 (Step A3). The purchaser views the various product information displayed on the screen of the purchaser terminal 10, specifies a product which the purchaser wishes to purchase, and entries the product to purchase on the screen (Step A4). In the display screen shown in FIG. 3, when the purchaser clicks the book A using a pointing device such as a mouse, the associated white box (□) changes to a filled-in black box (■), thereby recording the purchase of the book A. In FIG. 3, the purchase of the dictionary C is recorded in the same manner. The information for purchased products recorded in this manner is temporarily stored in the purchaser terminal 10 as purchase order information.

Subsequent to the above, if the "Delivery agent" button 101 on the screen of the purchaser terminal 10 is clicked using a pointing device, delivery agent information including a plurality of delivery agents that can deliver the ordered product is displayed on the screen of the purchaser terminal 10 such as shown in FIG. 4 (Step A5). The displayed delivery agent information includes the delivery agent names, website URLs for giving delivery instructions, and telephone numbers and the like. The purchaser selects (specifies) a desired delivery agent from among the plurality of delivery agents displayed on the screen. For example, if the purchaser selects the door-to-door delivery service D, the associated white box (□) changes to a filled-in black box (■), thereby the specification of the door-to-door delivery service D as the desired delivery agent is recorded (Step A6). The information of the specified delivery agent is temporarily stored in the purchaser terminal 10 as distribution specification information.

Next, when the purchaser clicking the "order button" 102 on the screen of the purchaser terminal 10 using the pointing device, the purchase order information and distribution specification information stored in the purchaser terminal 10, are sent to the seller terminal 20 via the network 40 (Step A7).

Next, when the seller terminal 20 receives the purchase order information and the distribution specification information sent from the purchaser terminal 10 (Step A8), the seller terminal 20 generates purchase order identification information for the purpose of identifying the purchaser and details of the purchase (Step A9). The seller terminal 20 sends the purchase order identification information to both the purchaser terminal 10 used by the purchaser and the delivery agent terminal 30 of the delivery agent specified by the distribution specification information (Step A10). The purchase order identification information can be made verifiable from a web page of the seller terminal or of the delivery agent terminal, and can also be notify to the purchaser by e-mail or the like.

Next, the delivery agent stores purchase order identification information received from the seller terminal 20 (Step A11).

According to this embodiment of the present invention, by the purchaser repeating Steps A1 through A11 with respect to an arbitrary seller, it is possible for the purchaser to request a single delivery agent to delivery all products purchased from a plurality of sellers.

If the purchaser desires to be delivered all products purchased from different sellers by a single delivery agent, the purchaser clicks on "Delivery agent" button 103 on the purchaser terminal 10 as shown in FIG. 5. Then as delivery agent information as shown in FIG. 4 is displayed, the purchaser selects, for example, the door-to-door delivery service D on the purchaser terminal 10.

As described above, the first embodiment of the present invention is a sales and delivery support system, which supports product sales and delivery using a purchaser terminal 10 used by a purchaser, a seller terminal 20A used by a seller, and a delivery agent terminal 30A used by a delivery agent, terminals 10, 20A, 30A being capable of mutual communication via a communication network 40, wherein a first means in which the seller terminal 20A sends to the purchaser terminal 10 product information with respect to a plurality of products which the seller sells and delivery agent information with respect to a plurality of delivery agents which deliver the products to the purchaser, in response to an access from the purchaser terminal 10 (Step A1, A2), a second means in which the seller terminal 20A receives information regarding products which the purchaser specifies to order and information in which the purchaser specifies a desired delivery agent for delivery of the ordered product, from the purchaser terminal 10 (Step A7, A8), and generates purchase order identification information to identify the purchaser and the ordered product and for use to deliver the ordered product by the specified delivery agent (Step A9), and a third means in which the seller terminal 20A sends the purchase order identification information to the purchaser terminal 10 and the delivery agent terminal 30A.

A computer program of the first embodiment of the present invention comprises the steps of; sending product information with respect to a plurality of products which the seller sells and delivery agent information with respect to a plurality of delivery agents which deliver the products to the purchaser, from the seller terminal 20A to the purchaser terminal 10, in response to an access from the purchaser terminal 10 (Step A1, A2), receiving information regarding products which the purchaser specifies to order and information in which the purchaser specifies a desired delivery agent for delivery of the ordered product, from the purchaser terminal 10 (Step A7, A8), generating purchase order identification information to identify the purchaser and the ordered product and for use to deliver the ordered product by the specified delivery agent, in the seller terminal 20A (Step A9) and sending the purchase order identification information from the seller terminal 20A to the purchaser terminal 10 and the delivery agent terminal 30A.

Second Embodiment

Figures 7, 8:
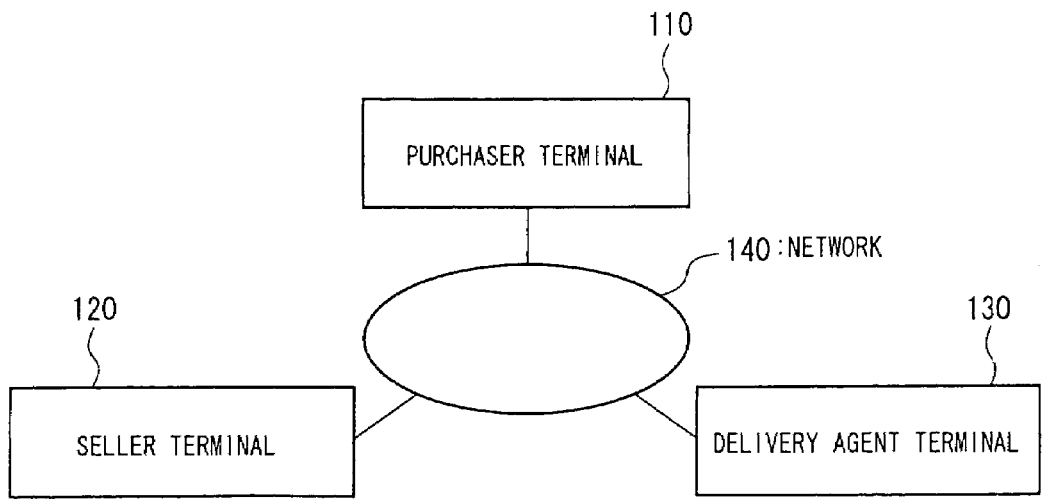
FIG. 7 is a drawing showing product information on the display screen of the purchaser terminal in a sales and delivery support system according to an embodiment of the present invention.
FIG. 8 is a block diagram showing the configuration of a conventional sales and delivery support system.

Next, the operation when a purchaser instructs a delivery agent to do batch delivery of products purchased from a plurality of sellers at a later time is described below. FIG. 6 is a flowchart showing the operation of a sales and delivery support system according to the second embodiment of the present invention, and FIG. 7 is a drawing showing a display screen of the purchaser terminal 10 in a sales and delivery support system according to the second embodiment of the present invention.

Referring to FIG. 6, in order to instruct delivery of purchased products, the purchaser, by using the purchaser's own purchaser terminal 10, accesses a web page established on the network 40 by a delivery agent (Step B1). In response to this, the delivery agent terminal 30 requests the purchaser terminal 10 to specify purchase order identification information (Step B2).

Next, the purchaser performs batch sending of purchase order identification information of orders for desired products to be delivered from the purchaser terminal 10 to the delivery agent terminal 30 (Step B3).

Next, the delivery agent terminal 30 compares the purchase order identification information sent from the purchaser terminal 10 with the purchase order identification information sent from the seller terminal 20 (Step B4) and, in the case in which the purchaser is a proper purchaser, sends a request to specify a delivery agent, delivery date/time and delivery location to the purchaser terminal 10 (Step B5).

Next, at the purchaser terminal 10, by receiving the request to specify a delivery agent, delivery date/time and delivery location from the delivery agent terminal 30, various information, such as shown in FIG. 7, is displayed on a screen (Step B6). The purchaser views the order information displayed on the screen of the purchaser terminal 10, selects a product which the purchaser desires to be delivered in the lump (Step B7). In the example shown in FIG. 7, when the purchaser clicks on the delivery field for the book A, the associated white box (□) changes to a filled-in black box (■), thereby indicating the recording of the desire to have the book A delivery. In the example shown in FIG. 7, the dictionary and the CD-Y are recorded for delivery in the same manner. In contrast to this, in FIG. 7, desire for delivery of a 200-sheet pack of copier paper and a black ink cartridge is not recorded. The purchaser also specifies the a desired date and time and a desired location for delivery. The specified delivery agent and the specified delivery date and time and delivery location are temporarily stored in the purchaser terminal 10 as delivery instruction information (Step B8). After this specification is made, when the purchaser clicking the "Delivery" button 104 as shown in FIG. 7 using the pointing device, delivery instruction information including delivery agent and desired delivery date/time/ location information stored in the purchaser terminal 10 are sent to a delivery agent terminal 30 via the network 40 (Step B9).

Next, upon receiving the delivery instruction information from the purchaser terminal 10 (Step B10), the delivery agent terminal 30 outputs the delivery instruction information to a display or as a printout or the like. The delivery agent collects all products specified by the delivery instruction information (Step B1), and deliveries all the collected products on the specified date, at the specified time, and to the specified location (Step B12).

As described above, the second embodiment of the present invention is a sales and delivery support system, which supports product sales and delivery using a purchaser terminal 10 used by a purchaser, a seller terminal 20A used by a seller, and a delivery agent terminal 30A used by a delivery agent, terminals 10, 20A, 30A being capable of mutual communication via a communication network 40, wherein a first means in which the delivery agent terminal 30A receives purchase order identification information to identify a purchaser and a product ordered by the purchaser, from the seller terminal 20A (Step A11), a second means in which the delivery agent terminal 30A requests to the purchaser terminal 10, to specify purchase order identification information issued by the seller terminal 20A, in response to an access from the purchaser terminal 10 (Step B1, B2), a third means in which the delivery agent terminal 30A receives purchase order identification information from the purchaser terminal 10 (Step B3), and compares the purchase order identification information received from the purchaser terminal 10 with the purchase order identification information received from the seller terminal 20A (Step B4), a fourth means in which the delivery agent terminal 30A sends delivery order request information to request to specify a desired delivery agent for delivery of the ordered product, to the purchaser terminal 10 (Step B5), when there is coincidence between the two purchase order identification information, and a fifth means in which the delivery agent terminal 30A receives from the purchaser terminal 10 delivery instruction information which specifies an ordered product, a desired delivery agent and desired delivery date/time/ location by the specified delivery agent (Step B9, B10).

A computer program of the second embodiment of the present invention comprises the steps of; receiving purchase order identification information to identify a purchaser and a product ordered by the purchaser, from the seller terminal 10, in the delivery agent terminal 30A (Step A11), sending a request to specify purchase order identification information issued by the seller terminal 20A, from the delivery agent terminal 30A to the purchaser terminal 10, in response to an access from the purchaser terminal 10 (Step B1, B2), receiving purchase order identification information from the purchaser terminal 10 in the delivery agent terminal 30A (Step B3), comparing the purchase order identification information received from the purchaser terminal 10 with the purchase order identification information received from the seller terminal 20A, in the delivery agent terminal 30A (Step B4), sending delivery order request information to request to specify a desired delivery agent for delivery of the ordered product, from the delivery agent terminal 30A to the purchaser terminal 10, when there is coincidence between the two purchase order identification information (Step B5), and receiving from the purchaser terminal 10 delivery instruction information which specifies an ordered product, a desired delivery agent and desired delivery date/time/location by the specified delivery agent, in the delivery agent terminal 30A (Step B9, B10).

By adopting the technical constitution described in detail above, the present invention achieves a number of effects.

A first effect achieved by the present invention is to reduce the delivery cost.

A second effect achieved by the present invention is to shorten the time that a purchaser is required to stay home.

What is claimed is:

1. A sales and delivery support system, which supports product sales and delivery, comprising:
   a purchaser terminal used by a purchaser;
   a plurality of seller terminals used by a corresponding plurality of sellers; and
   a plurality of delivery agents terminal used by a corresponding plurality of delivery agents,
   said terminals being capable of mutual communication via a communication network;
   a first means in which, in response to a direct access made by said purchaser terminal to at least a first and a second seller terminal among said plurality of seller terminals, said first and second seller terminals each send directly to said purchaser terminal both (1) product information with respect to a plurality of products sold by said first and second sellers respectively and (2) delivery agent information with respect to said plurality of delivery agents, each of which is able to deliver said plurality of products to said purchaser;
   a second means in which each of said first and second seller terminals both (1) receives from said purchaser terminal information regarding a purchase order of at least one product of said corresponding plurality of products and a same, single selected delivery agent of said plurality of delivery agents and (2) generates purchase order identification information that identifies said purchaser and said purchase order;
   a third means in which said seller terminal sends said purchase order identification information to both said purchaser terminal and a corresponding selected delivery agent terminal of said single selected delivery agent;
   a fourth means in which, in response to a direct access made by said purchaser terminal to said corresponding selected delivery agent terminal, said corresponding selected delivery agent terminal sends to said purchaser terminal a request to transmit at least one piece of purchase order identification information;
   a fifth means in which said corresponding selected delivery agent terminal both (1) receives from said purchaser terminal at least one piece of purchase order identification information from each of said first and second seller terminals and (2) compares said purchase order identification information with purchase order identification information that said corresponding selected delivery agent terminal has received from said first and second seller terminals;
   a sixth means in which, if said comparison results in at least two matches, said corresponding selected delivery agent terminal sends to said purchaser terminal a request to transmit delivery instruction information regarding delivery of products corresponding to said at least two matches;
   a seventh means in which said corresponding selected delivery agent terminal receives from said purchaser terminal delivery instruction information instructing batch delivery of at least two of said products corresponding to said at least two matches, wherein said at least two of said products corresponding to said at least two matches are purchased from said first and second sellers and wherein said batch delivery is to be delivered by said selected delivery agent to said purchaser at a single time.

2. A sales and delivery support system, which supports product sales and delivery, comprising:
   a purchaser terminal used by a purchaser;
   a first seller terminal used by a first seller;
   a second seller terminal used by a second seller; and
   a plurality of delivery agent terminals used by a corresponding plurality of delivery agents,
   said terminals being capable of mutual communication via a communication network,
   in response to a direct access made by said purchaser terminal to said first seller terminal, said first seller terminal sending directly to said purchaser terminal both (1) product information with respect to a first plurality of products sold by said first seller and (2) delivery agent information with respect to said plurality of delivery agents, each of which is able to deliver said first plurality of products to said purchaser,
   said first seller terminal both (1) receiving from said purchaser terminal information regarding a first purchase order of at least one product of said first plurality of products and a specified single delivery agent of said first plurality of delivery agents and (2) generating a first piece of purchase order identification information that identifies said purchaser and said first purchase order,
   said first seller terminal sending said first piece of purchase order identification information to both said purchaser terminal and a corresponding specified delivery agent terminal of said specified single delivery agent,
   in response to a direct access made by said purchaser terminal to said second seller terminal, said second seller terminal sending directly to said purchaser terminal both (1) product information with respect to a second plurality of products sold by said second seller and (2) delivery agent information with respect to said plurality of delivery agents, each of which is able to deliver said second plurality of products to said purchaser,
   said second seller terminal both (1) receiving from said purchaser terminal information regarding a second purchase order of at least one product of said second plurality of products and said specified single selected delivery agent of said plurality of delivery agents and (2) generating a second piece of purchase order identification information that identifies said purchaser and said second purchase order, said second seller terminal sending said second piece of purchase order identification information to both said purchaser terminal and the corresponding specified delivery agent terminal of said specified single delivery agent, in response to a direct access made by said purchaser terminal to said corresponding specified delivery agent terminal, said corresponding specified delivery agent terminal sending said purchaser terminal a request to transmit at least one piece of purchase order identification information, said corresponding specified delivery agent terminal both (1) receiving from said purchaser terminal at least two pieces of purchase order identification information and (2) comparing said at least two pieces of purchase order identification information with purchase order identification information that said corresponding specified delivery agent terminal has received from said first and said second seller terminals, if said comparison results in at least two matches, said corresponding specified delivery agent terminal sending said purchaser terminal a request to transmit delivery instruction information regarding delivery of products corresponding to said at least two matches, said corresponding specified delivery agent terminal receiving from said purchaser terminal delivery instruction information instructing batch delivery of at least two of said products corresponding to said at least two matches, wherein said at least two of said products corresponding to said at least two matches comprise at least one product ordered under said first purchase order and at least one product ordered under said second purchase order and wherein said batch delivery is to be delivered by said specified single delivery agent to said purchaser at a single time.

* * * * *